(12) United States Patent
Diamond

(10) Patent No.: US 11,040,630 B2
(45) Date of Patent: Jun. 22, 2021

(54) WIRELESS ROAD CHARGING SYSTEM

(71) Applicant: Richard Diamond, Far Hills, NJ (US)

(72) Inventor: Richard Diamond, Far Hills, NJ (US)

(*) Notice: Subject to any disclaimer, the term of this patent is extended or adjusted under 35 U.S.C. 154(b) by 131 days.

(21) Appl. No.: 16/575,927

(22) Filed: Sep. 19, 2019

(65) Prior Publication Data

US 2020/0361325 A1 Nov. 19, 2020

Related U.S. Application Data

(60) Provisional application No. 62/849,472, filed on May 17, 2019.

(51) Int. Cl.
| | |
|---|---|
| *B60L 53/12* | (2019.01) |
| *B60L 53/30* | (2019.01) |
| *E01C 1/00* | (2006.01) |
| *E01F 11/00* | (2006.01) |
| *B60L 53/66* | (2019.01) |

(52) U.S. Cl.
CPC ........... *B60L 53/12* (2019.02); *B60L 53/30* (2019.02); *B60L 53/665* (2019.02); *E01C 1/002* (2013.01); *E01F 11/00* (2013.01)

(58) Field of Classification Search
CPC .............................. B60L 53/12; B60L 53/665
USPC ........................................................ 320/109
See application file for complete search history.

(56) References Cited

U.S. PATENT DOCUMENTS

| | | | |
|---|---|---|---|
| 8,030,888 B2 | 10/2011 | Pandya et al. | |
| 8,439,597 B2 | 5/2013 | Diamond | |
| 9,394,650 B2 | 7/2016 | Diamond | |
| 2012/0081624 A1* | 4/2012 | Kobayashi | H04N 13/341 349/15 |
| 2014/0300250 A1* | 10/2014 | Marin Ramirez | E01F 11/00 310/319 |
| 2016/0023557 A1* | 1/2016 | Dimke | B60L 53/66 320/108 |
| 2019/0118659 A1* | 4/2019 | Gou | H01M 10/44 |
| 2019/0286136 A1* | 9/2019 | Nakatsuka | B60L 53/32 |
| 2021/0081624 A1* | 3/2021 | Kovarik | G06K 7/10376 |

FOREIGN PATENT DOCUMENTS

DE WO2018024318 A1 2/2018

\* cited by examiner

*Primary Examiner* — Suchin Parihar
(74) *Attorney, Agent, or Firm* — Thomas J. Germinario

(57) ABSTRACT

A system is provided for inductively charging the battery of an electric vehicle as it travels along a roadway. The system comprises a series of asphalt paving seam gaskets within which are embedded magnetic field generators. The magnetic field generator gaskets are arranged with opposite polarities exposed on either side of each of the charging lanes, so that induction wires within the vehicle transect the magnetic field lines and generate an electric current to charge the vehicle battery. Energy generated and/or distance travelled in the charging lanes can be metered and reported in order to impose user fees.

10 Claims, 5 Drawing Sheets

WIRELESS ROAD CHARGING SYSTEM

REFERENCE TO RELATED APPLICATION

This application claims the benefit of the filing date of U.S. Provisional Patent Application No. 62/849,472, filed May 17, 2019, which is incorporated herein by reference.

FIELD OF INVENTION

The present invention relates to the field of roads that can wirelessly charge a moving electric vehicle.

BACKGROUND OF THE INVENTION

A major factor impeding the commercialization of electric vehicles is the relative scarcity of plug-in type charging stations and the relatively long charging times. A promising alternative to plug-in charging is wireless charging using magnetic field generators embedded in a roadway to couple wirelessly with induction wires in a moving vehicle so as to charge the vehicle battery. But there are problems with the wireless charging road systems that have been proposed to date.

Currently proposed systems involve burying the magnetic field generators under the top course paving of the roadway. These systems require re-paving of entire road networks, which is both prohibitively expensive and would take decades to implement. Moreover, repaving an asphalt top course over magnetic field generators will subject them to the enormous pressure of compacting the asphalt, which is likely to damage them. Locating magnetic field generators in the road base also exposes them to groundwater and road runoff. Compacted asphalt does not readily propagate magnetic fields, and road paving may be several feet thick, thereby limiting the inductive potential of the system.

Consequently, there remains the need for a wireless road charging system that enables placement of the magnetic field generators near the surface of the roadway in an environment that is protected from moisture, paving compaction forces and the weight of vehicles.

SUMMARY OF THE INVENTION

As used herein, the term "magnetic field generator" means a permanent magnet, an electromagnet and/or a combination of both.

The present invention incorporates multiple magnetic field generators into seam gaskets which laterally support the top course and seal the seams of each paved travelled lane of a roadway. Examples of such seam gaskets are the "Asphalt Paving Seam Gasket" as disclosed in U.S. Pat. No. 9,394,650, and the "Asphalt Paving Seam Sealer System" as disclosed in U.S. Pat. No. 8,439,597, both of which are incorporated herein by reference. The seam gaskets are designed to form an edge seal for road pavement lanes and to buttress asphalt compaction. The gasket material is a water-impermeable rigid polymer or polymer blend that withstands compressive forces. Therefore, with the magnetic field generators embedded in the gasket, they are protected from moisture and the compressive forces of asphalt paving, as well as the weight of travelling vehicles. Moreover, the magnetic field generators can be embedded near the top of the gasket's seam wall, so that they are close to the road surface, from which the magnetic field can readily propagate.

The present invention is a system for wirelessly charging the battery of an electric-powered vehicle, which can be either fully electric-powered or a gasoline/electric hybrid. The wireless charging occurs while the vehicle is travelling along a dedicated charging lane of a roadway. Each charging lane has a top-course that is laterally supported by two paving seam gaskets, one along the edge of the right-side of the lane and one along the edge of the left-side of the lane (as viewed facing the direction of travel).

Multiple magnetic field generators are embedded at uniform intervals along each of the paving seam gaskets. The magnetic field generators comprise permanent magnets, electro-magnets, or a combination of both. If electro-magnets are used, they are electrically connected by wiring through the seam gaskets to one or more DC power supplies. Optionally, each of the magnetic field generators can be enclosed in a waterproof, rigid, non-magnetic case, in order to further protect it from compressive forces and environmental elements. Each magnetic field generator has two magnetic poles, which are designated North and South, and which are aligned in a generally vertical direction within the paving seam gasket.

For each charging lane, the upper poles of the magnetic field generators embedded in the right-side paving seam gasket must be opposite in polarity to the upper poles of the magnetic field generators embedded in the left-side paving seam gaskets, in order to generate a magnetic field transversely across the charging lane. The transverse magnetic field lines are transected by one or more induction wires in the electric-powered vehicle while travelling along the charging lane. The induction wire(s) are oriented in a generally vertical direction so as to be perpendicular to the magnetic field lines, which are generally horizontal. The induction wire(s) are electrically connected to the vehicle battery so that the induced current generated by the induction wire(s) cutting across the magnetic field charges the vehicle battery. The vehicle battery can be of a rechargeable lithium or lithium-ion type.

On multi-lane roadways, the paving seam gaskets of adjoining uni-directional charging lanes can be shared, while the separate adjacent paving seam gaskets of non-adjoining uni-directional charging lanes must have upper poles of the same polarity to prevent the generation of a magnetic field between the adjacent charging lanes. Separate adjacent, non-adjoining opposing charging lanes will also have upper poles of the same polarity in their separate adjacent paving seam gaskets, again in order to prevent the generation of inter-lane magnetic fields.

Preferably, the electric-powered vehicle is equipped with a meter which measures and compiles data of either the electrical energy generated by the vehicle while travelling in a charging lane or the distance travelled in a charging lane. The data is transmitted to the roadway operator in order to bill the vehicle owner for their use of the charging lane to charge the vehicle battery. The meter can be of the type commonly used for billing of highway tolls.

A major advantage of this system is that it can be economically implemented in conjunction with a nation-wide roadway infrastructure program. Since the wireless charging system is incorporated in asphalt paving seam gaskets, its installation becomes part of the top-course paving process needed to maintain and upgrade the nation's highway system. The typical highway repaving cycle is about 15 years, within which time the entire U.S. highway system could incorporate wireless charging lanes with only a modest additional investment of public funds. Moreover, that initial public investment would be recouped many times over through the system's user fees. In effect, therefore, this system would enable a complete national highway system overhaul at zero net cost and, in addition, an increasing revenue stream for years to come.

It would also eliminate the major impediment to conversion from gasoline/diesel-powered vehicles to electric-powered vehicles, with enormous attendant benefits to the environment and climate.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope of the foregoing summary description.

DETAILED DESCRIPTION OF THE PREFERRED EMBODIMENT

Figure 1:
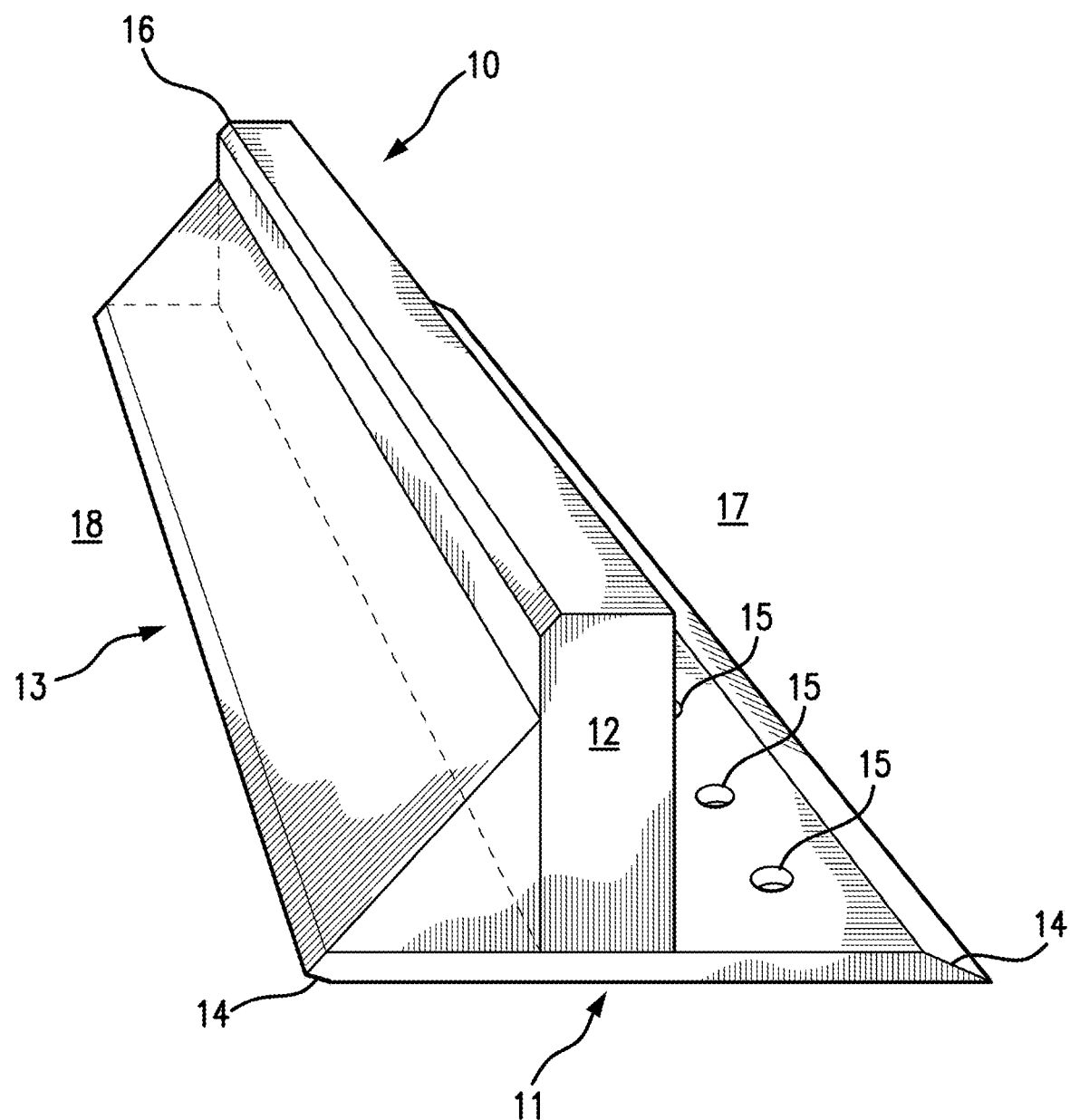
FIG. 1 is a perspective view of an exemplary asphalt paving seam gasket as disclosed in U.S. Pat. No. 9,394,650.

Referring to FIG. 1, an asphalt paving seam gasket 10, comprises a footing sheet 11, a seam wall 12 and a ramp extension 13. The gasket 10 is made of a water-impermeable rigid polymer or polymer blend material that is resistant to environmental extremes of temperature and humidity and can withstand prolonged exposure to heat, cold, ozone, ultra-violet radiation, and hydrocarbons. The gasket material also has high tensile and tear strength and remains rigid under compression and elongation over a broad temperature range. In order to increase their adhesiveness and protect them from oxidative and chemical degradation, the contact surfaces of the gasket 10 are coated with an adhesive resin having the same mechanical properties enumerated above. Suitable adhesive resins are epoxy resins and/or silicone resins, as well as silicone-epoxy hybrid polymers and epoxy-modified polysiloxanes. The adhesive-coated contact surfaces are the top and bottom surfaces of the footing sheet 11, the side walls of the seam wall 12, and the slope of the ramp extension 13.

The footing sheet 11 has beveled edges 14 on either side, and on the cold joint side 17 has multiple anchoring means 15, which can be screw sockets or nail holes, for securing the footing 11 to the substrate.

The seam wall 12 has a beveled upper edge 16 on the hot joint side 18. The ramp extension 13 abuts the seam wall 12 on the hot joint side 18 and extends preferably to one-half the height of the seam wall 12. The base of the ramp extension 13 is coextensive with the hot joint side 18 of the ramp extension 13.

Once the gasket 10 is anchored to the substrate, the seam wall 12 provides support for the compaction of the initial lane on the cold joint side 17, while the ramp extension 13 provides sloped vehicular access to the initial lane from the hot joint side 18. Multiple gaskets 10 can be longitudinally ganged together to border an entire roadway lane.

Figure 2:
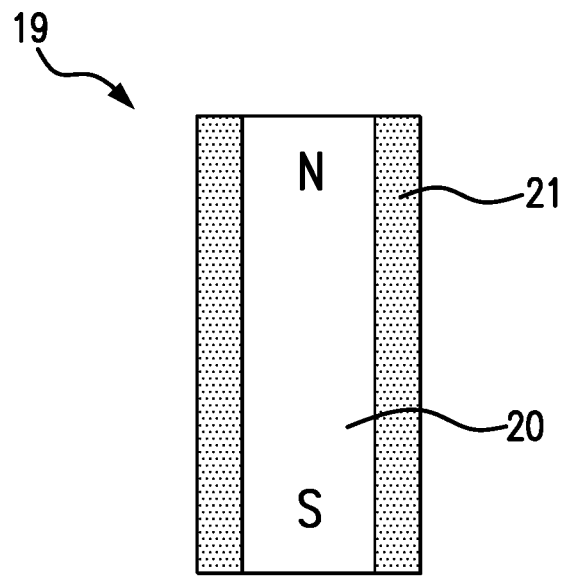
FIG. 2 is a front cross-section view of an exemplary magnetic field generator according to the preferred embodiment of the present invention.
Figure 3:
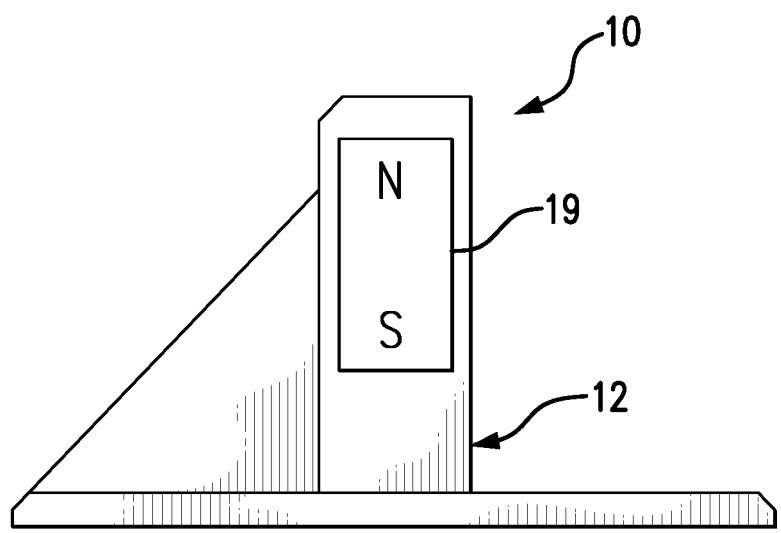
FIG. 3 is side cross-section view of the exemplary asphalt paving seam gasket of FIG. 1 having the exemplary magnetic field generator of FIG. 2 embedded in the seam wall of the gasket.

As depicted in FIG. 2, an exemplary magnetic field generator 19 comprises a permanent magnet 20 having north and south poles. Optionally, the magnet 20 can be encased in a rigid tube 21 to further protect it from asphalt compaction forces. As shown in FIG. 3, the magnetic field generator 19 is embedded in the seam wall 12 of the asphalt paving seam gasket 10, so that it is protected from environmental elements, moisture and compactive forces and can be positioned close to the road surface. It should be understood that the orientation of the north and south poles of the magnet 20 can be reversed from that illustrated in FIG. 3.

Figure 4:
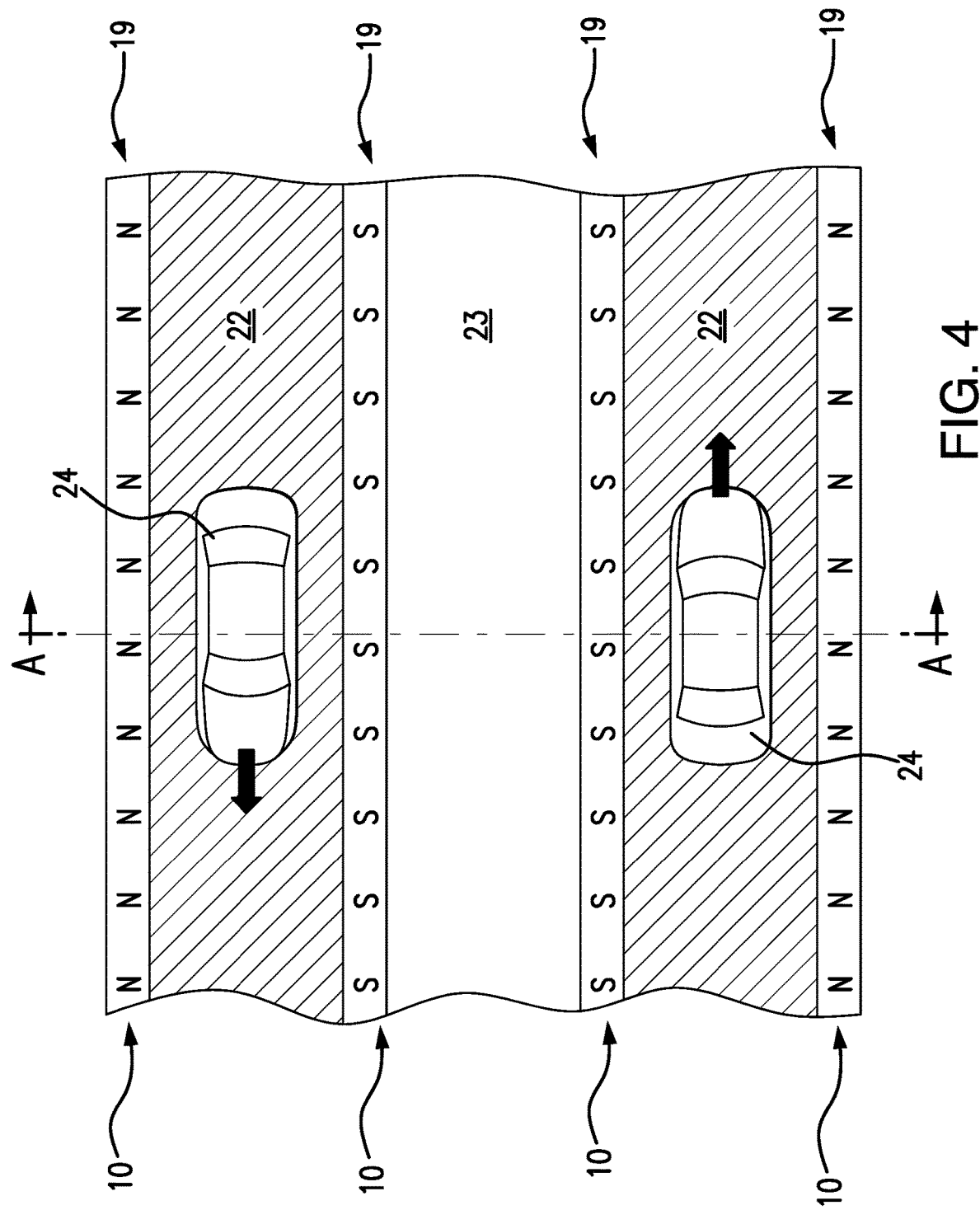
FIG. 4 is a top plan view of an exemplary road charging system according to one embodiment of the present invention.

Referring to FIG. 4, an exemplary embodiment of the present invention is implemented on a roadway comprising two opposing lanes 22 and a central median strip 23. Along the seams/edges of each lane 22 are a series of magnetic field generators 19 embedded in asphalt paving seam gaskets 10. As depicted, the magnetic field generators 19 are oriented with their north poles upward on the right side of each lane and the south poles upward on the left side of each lane. It should be understood that this polarity configuration can be reversed, as long as the orientations of the magnetic poles are opposite on the right and left sides of the lanes 22. The upward-facing polarities on adjacent sides of the lanes 22 must also be the same to avoid magnetic interference between the lanes 22.

Figure 5:
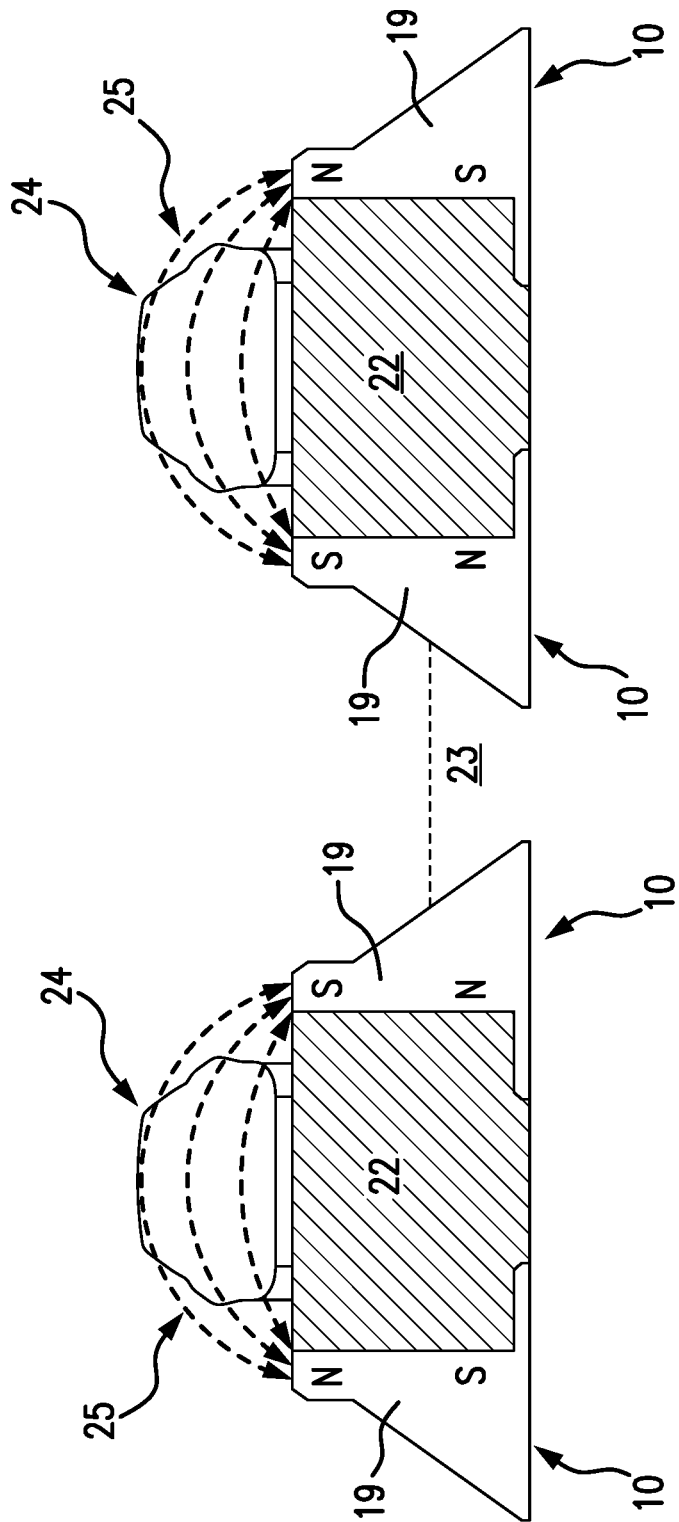
FIG. 5 is a cross-section view of the exemplary road charging system of FIG. 4 taken along the line A-A'.

FIG. 5 is a cross-sectional view of the exemplary road charging system shown in FIG. 4. Electric vehicles 24 travelling along the road lanes 22 are penetrated by magnetic field lines 25 passing from the exposed north poles of the magnetic field generators 19 on the right side of each lane 22 to the exposed south poles of the magnetic field generators 19 on the left side of each lane 22. It should be noted that this configuration avoids direct application of the weight of the vehicle 24 to the magnetic field generators 19.

Figure 6:
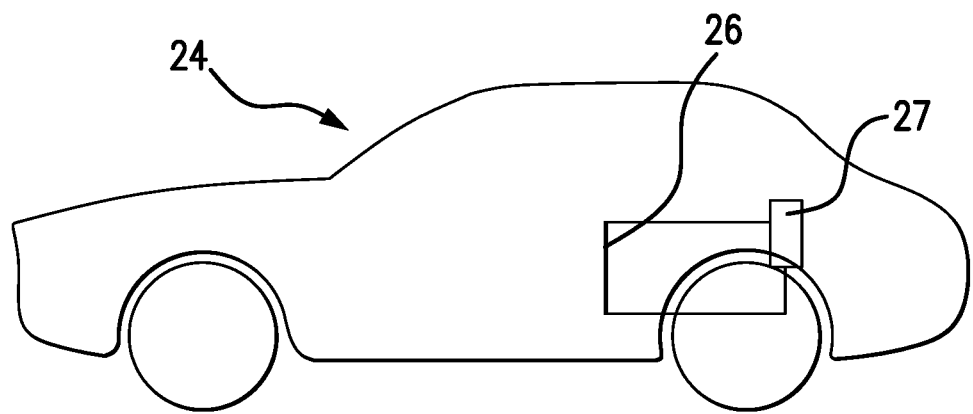
FIG. 6 is a cross-section view of an exemplary electric vehicle containing an inductive charging device according to one embodiment of the present invention.

FIG. 6 depicts an exemplary electric vehicle 24 having at least one induction wire 26 electrically connected to the vehicle battery 27. The induction wire 26 is vertically oriented so as to cut across the magnetic field lines 25 as the vehicle 24 travels along the road lane 22, thereby generating an induced electric current which charges the vehicle battery 27. Optionally, the electric vehicle 24 can be equipped with a meter (not shown) to measure and report the vehicle's use of the charging lanes 22 for purposes of billing user fees.

Depending on the length of the charging lanes 22, the charging rate can be adjusted by increasing the number of magnetic field generators 19 in the gaskets 10 and/or the number of induction wires 26 in the electric vehicles 24.

Although the preferred embodiment of the present invention has been disclosed for illustrative purposes, those skilled in the art will appreciate that many additions, modifications and substitutions are possible, without departing from the scope and spirit of the present invention.

What is claimed is:

1. A system for wirelessly charging at least one vehicle battery of an electric-powered vehicle while the electric-powered vehicle is travelling along a charging lane of a roadway, the system comprising:

the roadway, at least one lane of which is the charging lane, wherein the charging lane comprises a top-course paving which is laterally supported on both sides by two paving seam gaskets, consisting of a right-side gasket and a left-side gasket;

multiple magnetic field generators, which are embedded at uniformly spaced intervals along each of the paving seam gaskets, wherein each of the magnetic field generators comprises two magnetic poles having opposite polarities and consisting of a North magnetic pole and a South magnetic pole, and wherein each of the magnetic field generators is generally vertically aligned within one of the paving seam gaskets, and wherein an upper pole of the two opposite magnetic poles is directed generally upward, and a lower pole of the two opposite magnetic poles is directed generally downward, and wherein the polarity of the upper poles of the right-side gasket is opposite the polarity of the upper poles of the left side gasket, such that a magnetic field, comprising multiple magnetic field lines, is generated in a transverse orientation to the charging lane between the upper poles of the right-side gasket and the upper poles of the left-side gasket;

the electric-powered vehicle, comprising at least one induction wire, wherein the induction wire is generally vertically oriented and is electrically connected to the vehicle battery of the electric-powered vehicle, such that, while the electric-powered vehicle is travelling along the charging lane, the induction wire transects the magnetic field lines, thereby generating in the induction wire an induced electric current which charges the vehicle battery.

2. The system according to claim 1, wherein the roadway comprises multiple opposing lanes, consisting of first direction lanes and second direction lanes, and wherein at least one of the first direction lanes is a first direction charging lane, and wherein at least one of the second direction lanes is a second direction charging lane, and wherein the left-side gasket of the first direction charging lane faces the left-side gasket of the second direction charging lane, and wherein the polarity of the upper poles of the left-side gasket of the first direction charging lane is the same as the polarity of the upper poles of the left-side gasket of the second direction charging lane, such that no magnetic is generated between the upper poles of the left-side gasket of the first direction charging lane and the upper poles of the left-side gasket of the second direction charging lane.

3. The system according to claim 1, wherein the roadway comprises multiple uni-directional lanes, and wherein at least two of the uni-directional lanes are adjoining, and wherein the left-side gasket of an inner uni-directional charging lane consists of the right-side gasket of an adjoining outer uni-directional charging lane.

4. The system according to claim 2, wherein the roadway comprises multiple uni-directional lanes, and wherein at least two of the uni-directional lanes are adjoining, and wherein the left-side gasket of an inner uni-directional charging lane consists of the right-side gasket of an adjoining outer uni-directional charging lane.

5. The system according to claim 1, wherein the roadway comprises multiple uni-directional lanes, and wherein at least two of the uni-directional lanes are adjacent but non-adjoining, and wherein the left-side gasket of an inner uni-directional charging lane faces the right-side gasket of an non-adjoining, adjacent outer uni-directional charging lane, and wherein the polarity of the upper poles of the left-side gasket of the inner uni-directional charging lane is the same as the polarity of the upper poles of the right-side gasket of the outer uni-directional charging lane, such that no magnetic field is generated between the upper poles of the left-side gasket of the inner uni-directional charging lane and the upper poles of the right-side gasket of the outer uni-directional charging lane.

6. The system according to claim 2, wherein the roadway comprises multiple uni-directional lanes, and wherein at least two of the uni-directional lanes are adjacent but non-adjoining, and wherein the left-side gasket of an inner uni-directional charging lane faces the right-side gasket of an non-adjoining, adjacent outer uni-directional charging lane, and wherein the polarity of the upper poles of the left-side gasket of the inner uni-directional charging lane is the same as the polarity of the upper poles of the right-side gasket of the outer uni-directional charging lane, such that no magnetic field is generated between the upper poles of the left-side gasket of the inner uni-directional charging lane and the upper poles of the right-side gasket of the outer uni-directional charging lane.

7. The system according to claim 3, wherein the roadway comprises multiple uni-directional lanes, and wherein at least two of the uni-directional lanes are adjacent but non-adjoining, and wherein the left-side gasket of an inner uni-directional charging lane faces the right-side gasket of an non-adjoining, adjacent outer uni-directional charging lane, and wherein the polarity of the upper poles of the left-side gasket of the inner uni-directional charging lane is the same as the polarity of the upper poles of the right-side gasket of the outer uni-directional charging lane, such that no magnetic field is generated between the upper poles of the left-side gasket of the inner uni-directional charging lane and the upper poles of the right-side gasket of the outer uni-directional charging lane.

8. The system according to claim 4, wherein at least two of the uni-directional lanes are adjacent but non-adjoining, and wherein the left-side gasket of an inner uni-directional charging lane faces the right-side gasket of an non-adjoining, adjacent outer uni-directional charging lane, and wherein the polarity of the upper poles of the left-side gasket of the inner uni-directional charging lane is the same as the polarity of the upper poles of the right-side gasket of the outer uni-directional charging lane, such that no magnetic field is generated between the upper poles of the left-side gasket of the inner uni-directional charging lane and the upper poles of the right-side gasket of the outer uni-directional charging lane.

9. The system according to any one of claims 1-8, wherein the electric-powered vehicle is equipped with an electric meter which measures and compiles an induced electrical energy generated by the induction wire while the electric-powered vehicle is travelling in the charging lane, and wherein the electric meter transmits data of the induced electrical energy to an operator of the roadway for purposes of billing an owner of the electric-powered vehicle for the induced electrical energy.

10. The system according to any one of claims 1-8, wherein the electric-powered vehicle is equipped with a mileage meter which measures and compiles a travelled distance of the electric-powered vehicle in the charging lane, and wherein the mileage meter transmits data of the travelled distance to an operator of the roadway for purposes of billing an owner of the electric-powered vehicle for use of the charging lane.

* * * * *